United States Patent Office 3,822,288
Patented July 2, 1974

3,822,288
EPISULPHIDE PREPARATION PROCESS
Yves Labat, Pau, France, assignor to Societe Nationale des Petroles d'Aquitaine, Courbevoie, France
No Drawing. Filed Apr. 28, 1972, Ser. No. 248,432
Claims priority, application France, May 7, 1971, 7116663
Int. Cl. C07d 59/00
U.S. Cl. 260—327 E                          15 Claims

ABSTRACT OF THE DISCLOSURE

A process for preparing organic episulphides from mercapto-alkyl esters with the general formula

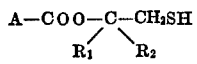

where A—COO— is an ester radical and $R_1$ and $R_2$, which are identical or different, are hydrogen, hydrocarbon radicals such as alkyls, aryls, aralkyls, alkaryls, cycloalkyls or others, characterized by decomposition of the mercapto-alkyl ester occurs in the gas phase, in the presence of a dehydration catalyst, at temperatures of between 180 and 300° C., and preferably in the presence of a solvent.

---

The process is particularly applicable to ethylene and propylene sulphides.

Episulphides are used in the preparation of polysulphides or as insecticides or fungicides.

This invention concerns a new process for preparing episulphides, especially those in which one of the carbon atoms may contain hydrocarbon substituents, notably substances with the general formula

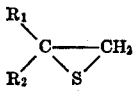

where $R_1$ and $R_2$, which are identical or different may be hydrogen, hydrocarbon radicals such as alkyl containing between 1 and 12 carbon atoms, including methyl, ethyl, propyl, butyl, isobutyl, tert-butyl, pentyl, hexyl and oxyl; aryl, such as benzenic radicals, substituted or not, aralkyl, alkaryl and cycloalkyl or others.

The invention concerns the preparation of ethylene sulphide and propylene sulphide in particular.

These episulphides are mainly used in producing polysulphides by polymerizing the monomer. The polysulphides thus obtained are rubbers used in numerous fields, as seals or road coatings, and in engineering structures. Certain episulphides can also be used as insecticides or fungicides, or as intermediate substances used in preparing such compositions.

Many ways of preparing ethylene and propylene sulphide have already been described, but none of them is entirely satisfactory. Episulphides are products which at present are of great industrial importance, and it is essential to obtain them by some simple, inexpensive process giving high yields, which was not always the case with existing methods.

Episulphides are sometimes obtained from olefins, sulphur being provided by $H_2S$, COS, $CS_2$, tetrasulphides or sulphur chloride. But yields are low, and most of these sulphur substances involve certain risks in handling.

The commonest processes at present involve preparation of episulphides from olefin oxides. Alkylene sulphide is obtained by the gas-phase reaction between an alkylene oxide, in the presence of solid catalysts placed in a catalytic bed, and certain compounds containing sulphur, such as COS, $CS_2$ or $H_2S$. Alkylene sulphide yields, however, are not more than 30 or 40%. Problems also arise with the catalyst, large quantities of which are needed. The reaction usually has to be done under pressure, and, in addition, large amounts of polysulphide form.

Ethylene sulphide has also been obtained by dehydrating mercapto-ethanol in the presence of acid potassium sulphate. This appears straightforward, but it cannot be regarded as a satisfactory way of preparing episulphides; decomposition of the mercapto-ethanol produces equimolecular quantities of water and episulphide, and the episulphide, which is unstable in contact with water, polymerizes into polysulphide, so that the episulphide yield is only 44%.

Ethylene sulphide can also be obtained by treating mercapto-ethyl acetate with a diluted aqueous alkaline solution; hydrolysis occurs rapidly, and 25% ethyl sulphide and large amounts of polymers are obtained, the ethylene episulphide polymerizing very quickly in the presence of a basic aqueous solution.

Existing descriptions also mention that mercapto-ethyl acetate cannot be decomposed in a neutral solution.

Despite the difficulties encountered with existing methods for preparing ethylene sulphide from mercapto-ethyl acetate, the present invention succeeds in offering an inexpensive way of preparing episulphides with the formula mentioned above. This process can be performed continuously, which is a great advantage over earlier methods, and it offers yields of at least 70% of practically pure episulphide; very little polymer forms, and the reacting products are easy to separate.

The new process according to this invention for preparing organic episulphides from mercapto-alkyl esters is characterized by the fact that decomposition of the mercapto-alkyl esters occurs in the gas phase, in the presence of a dehydrating catalyst, at temperatures of between 180 and 300° C., depending on the episulphide involved. In one embodiment of the invention, the reaction is performed in an inert solvent medium.

The reaction according to the invention can be written:

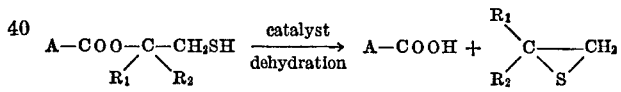

where A—COO— is a ester radical, preferably acetate. In contrast with earlier processes, the episulphide is not formed in the presence of water or a basic aqueous solution, and formation of polysulphides is consequently very limited.

The mercapto-alkyl ester decomposition catalyst is selected from the range of dehydrating catalysts; alumina-based catalysts are particularly suitable. Very satisfactory results are obtained when this alumina contains between 0.01 and 3%, and preferably between 0.05 and 0.008%, weight of $Na_2O$; it may also contain small amounts, up to 0.5%, and preferably between 0.01 and 0.1%, of ferric oxide, and up to 0.5%, and preferably between 0.01 and 0.1%, of silica.

The specific surface of the catalyst can vary widely, but is usually between 10 and 250 sq. m./g., and preferably between 50 and 80 sq. m./g.

Mercapto-alkyl esters, particularly mercapto-alkyl acetates, can be obtained by various processes, for instance by acetylation of 2-mercapto-alcohols, which themselves are obtained by the action of hydrogen sulphide on the corresponding epoxides, with a high yield. This acetylation, using acetic acid or anhydride, is done quantitatively. When acetic acid is used, the water that forms is eliminated by an azeotropic solvent such as benzene, cyclohexene, toluene or xylene.

2-mercapto-ethyl acetate, for instance, can also be obtained inexpensively by the photocatalyzed addition of hydrogen sulphide to vinyl acetate. Mercapto-ethyl acetate produces ethylene sulphide, and mercapto-propyl acetate produces propylene sulphide.

The process according to the invention can be performed by passing a gaseous flow of mercapto-alkyl acetate over a catalytic mass containing an alumina-based catalyst, collecting the products that form, and separating them out.

A recommended form of the invention consists of using mercapto-alkyl acetate diluted in a solvent which remains inert in relation to the reaction products, such as benzene, toluene, xylene or cyclohexane, the choice depending on the episulphide to be obtained; its boiling point must be sufficiently different from that of the episulphide. Xylene is recommended for the preparation of ethylene sulphide. The presence of a solvent offers a number of advantages. When mercapto-ethyl acetate is decomposed without solvent, the episulphide monomer has to be separated without delay from the acetic acid, to prevent the possible formation of polysulphides, and particularly of secondary reaction products like hydroxy-alkyl and mercapto-alkyl sulphide acetate. The presence of a solvent prevents the formation of such products, with a corresponding increase in the yield of episulphide. The solvent may be mixed with the mercapto-alkyl acetate, or added to the reaction mixture just after it has passed over the catalyst. When mercapto-alkyl acetate is obtained by acetylation of 2-mercapto-alcohol and elimination of the water that forms by means of a solvent, this solution should be used directly.

The decomposition temperature of the mercapto-alkyl acetate is an important variable in the reaction, which depends on the episulphide to be obtained. It is usually between 180 and 300° C. When the episulphide involved is ethylene episulphide, the temperature is between 230 and 270° C. If the reaction is performed at lower temperatures, mercapto-ethanol acetate conversion is lower, while too high a temperature begins with excellent conversion but soon causes clogging of the catalyst, because of cracking or polymerization of the reaction products.

Another embodiment of the invention consists of adding a flow of an inert gas, preferably nitrogen, together with the flow of mercapto-alkyl ester, possibly dissolved in a solvent. The proportion of inert gas can vary widely.

In one practical embodiment of the invention, a liquid flow of mercapto-alkyl ester, possibly dissolved in a solvent and a flow of nitrogen gas, are fed into the upper end of a vertical reactor. The first part of the reactor is equipped with a preheater which converts the reaction mixture into gas. The middle section contains the catalytic zone, in which the gas mixture passes over the dehydration catalyst. The reactor is surrounded by a heat-controlled casing, which allows the various parts of the reactor to be kept at the necessary temperatures. When ethylene sulphide is being prepared, the top of the reactor is kept at 260° C., the reaction zone at 240 to 250° C., and the bottom at approximately 200° C.

The rate at which the mercapto-alkyl acetate is added can vary quite considerably, but the best results are obtained with flows of approximately 5 to 10 moles an hour per litre of catalyst.

When the gaseous reaction products leave the reactor, they enter a tank kept at a temperature of approximately 110° C. The acetic acid and solvent condense and are collected at the base of a separating column, where they are separated and recycled, the acetic acid to the reactor in which the mercapto-alkyl acetate is being prepared from mercapto-alcohols, and the solvent to the mercapto-alkyl acetate and water separating column. This recycling of the acetic acid and solvent to the raw material preparation reactors is a major economic advantage inherent in this process.

The invention is illustrated by, without being confined to, the following examples.

EXAMPLE 1

A stainless steel tube, 30 mm. in diameter and 1 metre long, filled with a catalytic bed consisting of 0.1 litres of alumina containing 0.06% weight of $Na_2O$, 0.025% $Fe_2O_3$, and 0.02% $SiO_2$, and with a specific surface of 60 sq. m./g., was placed inside a vertical reactor. The ingredients were fed in at the top of the reactor, as follows:

liquid mercapto-ethyl acetate, at the rate of 0.15 moles/hr.
liquid xylene, at the rate of 0.2 moles/hr.
nitrogen, at the rate of 0.5 moles/hr.

The reaction zone was heated to 240 to 250° C.
After 200 hours' continuous functioning, the following results were obtained:

mercapto-ethyl acetate conversion for each passage: 85%
episulphide selectiveness: 83%
episulphide yield: 70.5%.

EXAMPLE 2

The same method was applied as in Example 1, except that no solvent was used. The results were as follows:

mercapto-ethyl acetate conversion for each passage: 78%
episulphide selectiveness: 78%
episulphide yield: 61%.

EXAMPLE 3

The same apparatus was used as in Example 1, but the gas mixture added was as follows:

mercapto-propyl acetate, at the rate of 0.4 moles/hr.
nitrogen, at the rate of 0.5 moles/hr.

The reaction zone was heated to about 215 to 220° C.
After 225 hours' continuous functioning, the following results were obtained:

mercapto-propyl acetate conversion for each passage: 82%
episulphide selectiveness: 94%
episulphide yield: 77%.

Propylene sulphide resists polymerization better than ethylene sulphide, so that selectiveness is accordingly higher, even in the absence of solvent.

What is claimed is:

1. A process for preparing organic episulphide from mercapto-alkyl ester of the formula

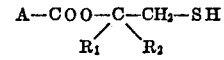

where A—COO— is an ester radical, and $R_1$ and $R_2$, which are identical or different, are hydrogen or alkyl of 1 to 12 carbon atoms, comprising decomposing the mercpto-alkyl ester in the gas phase, in the presence of an alumina dehydration catalyst, at temperatures of between 180 and 300° C.

2. A process according to claim 1, in which the ester radical is an acetate.

3. A process according to claim 1, in which the mercapto-alkyl is dissolved in a solvent which is inert in relation to the reaction products.

4. A process according to claim 1, in which the alumina contains 0.01 to 3% weight of $Na_2O$.

5. A process according to claim 1, in which the alumina contains up to 0.5% ferric oxide.

6. A process according to claim 1, in which the alumina contains up to 0.5% silica.

7. A process according to claim 3, in which the specific surface of the catalyst is between 10 and 250 sq. m./g.

8. A process according to claim 7, in which the specific surface of the catalyst is between 50 and 80 sq. m./g.

9. A process according to claim 1, in which the mercapto-alkyl ester is mercapto-ethyl acetate.

10. A process according to claim 1, in which the mercapto-alkyl ester is mercapto-propyl acetate.

11. A process according to claim 1, in which the reaction products are dissolved in an inert solvent, after the mercapto-alkyl ester has passed over the catalyst.

12. A process according to claim 1, in which the products are drawn along by a flow of inert gas.

13. A process according to claim 12, in which the inert gas is nitrogen.

14. A process according to claim 2, in which between 2 and 10 moles an hour of mercapto-alkyl acetate per litre of catalyst, a solvent and an inert gas are fed continuously into a reactor, and the reaction products are drawn off continuously, cooled and separated.

15. A process according to claim 3 in which the solvent is a member of the group of benzene, toluene, xylene and cyclohexane.

References Cited
FOREIGN PATENTS 998,606   7/1965   Great Britain _____ 260—327

OTHER REFERENCES

Miles, et al.: J. Chem. Soc. London, 1952, pp. 817–26.

ALAN L. ROTMAN, Primary Examiner

C. M. S. JAISLE, Assistant Examiner